May 15, 1934.   O. E. GRENIER   1,958,891
CREAM AND MILK COOLING DEVICE
Original Filed July 21, 1931
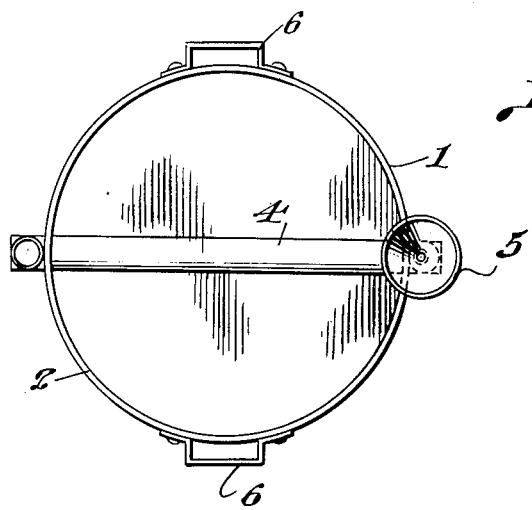
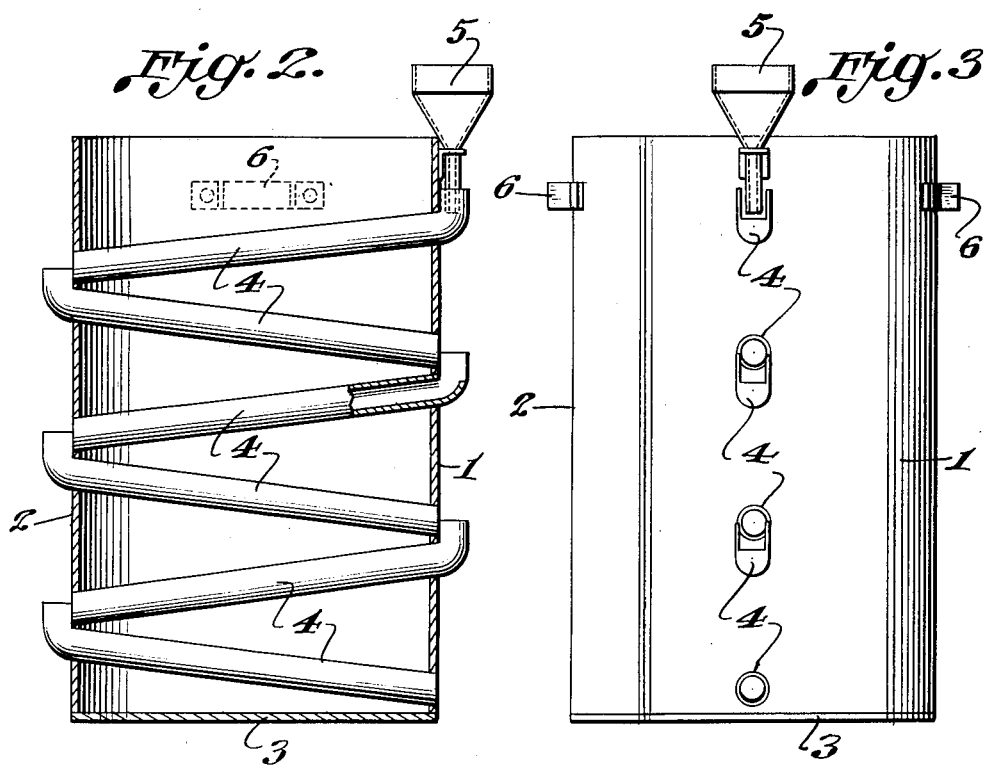

Patented May 15, 1934

1,958,891

UNITED STATES PATENT OFFICE 1,958,891

CREAM AND MILK COOLING DEVICE

Otis E. Grenier, Hammett, Idaho

Application July 21, 1931, Serial No. 552,118
Renewed September 7, 1933

1 Claim. (Cl. 31—4)

My present invention has reference to a milk and cream cooling device and has for its primary object to provide in a manner as hereinafter set forth an improved apparatus of a simple and inexpensive construction wherein cream or milk is caused to flow through a series of tubes arranged in a casing that contains cold water so that the milk after passing through the tubes will be aerated and cooled to the required temperature to aid in its keeping quality.

A further object is to provide a milk or cream cooling device that shall be of a small and compact nature so that the same can be easily handled, the warm milk or cream passing through effectively aerated and cooled to a desired temperature in an easy and expeditious manner and wherein the parts constituting the improvement may be easily and effectively cleaned without disassembling.

Another and important object thereof is to provide a cream and milk cooler which can be kept in a sanitary condition with a minimum amount of labor.

A still further object and advantage of this improvement is to provide a milk or cream cooler that will aerate as well as cool the cream or milk.

Further objects and advantages of this invention will be apparent as the description of the same proceeds and the invention will be best understood from a consideration of the following detailed description taken in connection with the accompanying drawing forming part of this specification, with the understanding, however, that the invention is not confined to any strict conformity with the showing of the drawing but may be changed or modified so long as such changes or modifications makes no material departure from the salient features of the invention as expressed in the appended claim.

In the drawing:

Figure 1 is a top plan view of the structure.

Figure 2 is a sectional view through the milk treating structure.

Figure 3 is a side view of the structure.

As shown in the drawing the present cooler comprises a main casing body 1 having side and bottom walls 2 and 3 respectively.

The receptacle 1 is preferably of cylindrical design as shown in Figure 1 and has extending longitudinally therethrough a series of tubes 4 which are arranged one directly above the other; in addition to the arrangement described each tube is arranged at an inclination, each of the tubes 4 extends at its ends through the side wall of the casing 1 and exteriorly of the casing the high end of each tube 4 is partly closed and extends beyond the end of the tube directly above it and is provided with flanges that extend to the sides of the tube adjacent to it. The tubes and flanges are securely fastened to the casing by a fluid tight joint.

A receptacle 5 with a suitable opening to control the flow of milk or cream into the tubes is provided.

The casing 1 is provided with handles 6.

It will be readily seen from this that liquid introduced into the receptacle 5 will flow downwardly and back and forth through the tubes to be discharged through the lowermost tube.

In the use of the present structure for cooling cream as it flows from a separator the receptacle 1 is filled with cold water, cream is poured into the receptacle 5 and allowed to flow through the opening into tubes 4 surrounded by cold water in the casing 1; both ends of the tubes 4 being open thus allowing passage of air, the cream is aerated and cooled.

While the description of the present structure has been confined to one group of tubes 4 it is of course to be understood that I do not wish to limit myself to the specific details for it is obvious that any number of groups of tubes may be employed.

From the foregoing description it will be readily seen that the present device may be made in sizes adapting it to both large and small dairies or home use.

Having described my invention, what I claim is:

A milk or cream cooling device of the character described, comprising a receptacle, a plurality of tubes extending through said receptacle and arranged in vertically spaced relation and being inclined in said receptacle, the high end of each tube extending exteriorly of the receptacle beyond the end of the tube directly above it, flanges on said extending portions at the high end of each tube, said flanges at the end of each tube extending to the sides of the next tube above, both ends of the tubes being open, and means to control the flow of liquid into the tubes.

O. E. GRENIER.